Patented Aug. 20, 1935

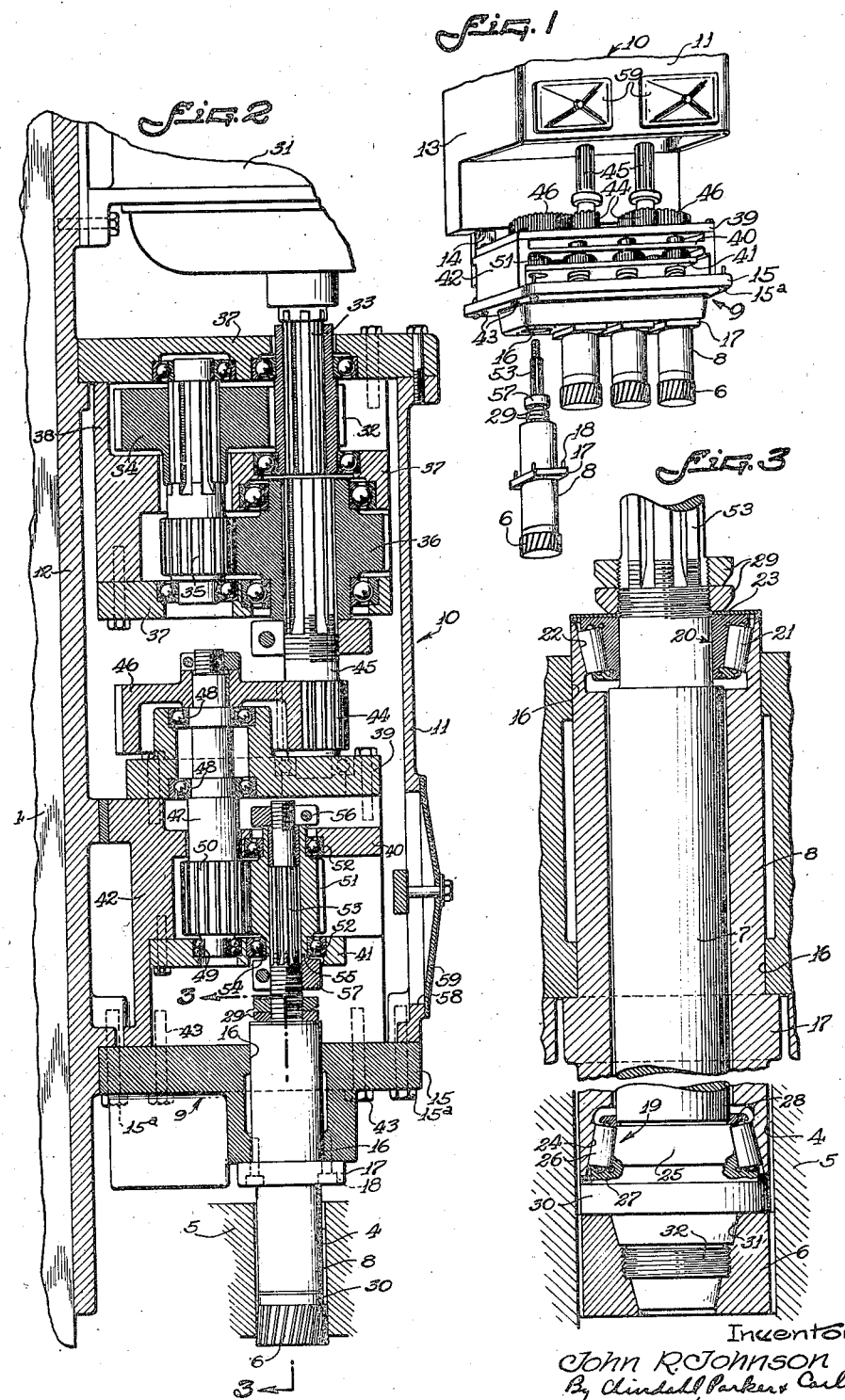

2,012,047

UNITED STATES PATENT OFFICE 2,012,047

BORING HEAD

John R. Johnson, Rockford, Ill., assignor to Ingersoll Milling Machine Company, Rockford, Ill., a corporation of Illinois Application December 12, 1932, Serial No. 646,805
Renewed June 18, 1935

7 Claims. (Cl. 77—4)

This invention relates to improvements in heads for boring machines and has more particular reference to a head for boring cylinders of relatively small diameter and substantial length such as those of modern internal combustion engine blocks.

Owing to the relatively small diameters of such cylinders and the fixed limitations thereby imposed upon the size of the parts which may enter the cylinder along with the cutter, it is customary to mount the cutter spindle in two widely spaced anti-friction bearings, one of which is stationarily mounted beneath the cylinder block and adapted to receive and act as a pilot guide for a so-called boring bar projected through the cylinder in advance of the cutter. In view of the severe wear and tear on this pilot bearing resulting from entry and withdrawal of the boring bar in the presence of foreign particles such as the chips formed during boring, it has been found impossible in practice to reduce and maintain the lateral play or deflection of the cutter to the extent required for precision boring at high speeds. Moreover, the use of the boring bar necessitates a travel of the cutter more than twice the length of the cylinder to be bored.

An important object of the present invention is to overcome the objections above enumerated and provide a novel boring head by which greater accuracy and higher speed operation can be obtained through long periods of service use in the boring of small and relatively long cylinders such as are used in internal combustion engines. This object is carried out through the provision of a novel construction and arrangement of the anti-friction bearings for the spindle enabling one of the bearings to be located closely adjacent the boring cutter and to enter the cylinder being bored without at the same time sacrificing strength and rigidity of the spindle and sleeve by which the anti-friction elements are supported.

Another object is to provide a new and improved head construction for boring machines by which the cutter spindle and its anti-friction bearing support constitute a unitary assembly which may be removed or assembled in the head quickly and conveniently.

A further object is to provide a multiple spindle boring head constructed to permit quick and convenient change of the spindle centers with a minimum change in the number of supporting and driving parts.

Other objects and advantages of the invention will become apparent from the following detailed description taken in connection with the accompanying drawing, in which Figure 1 is a fragmentary perspective view of a boring head embodying the features of the present invention, the parts being shown partially disassembled.

Fig. 2 is a sectional view of the head taken along a vertical plane adjacent one of the spindles.

Fig. 3 is a sectional view taken along the line 3—3 of Fig. 2.

In the drawing, the head shown by way of illustration is adapted for boring a plurality of cylinders 4 of relatively small diameter and of a length substantially greater than the diameter, the cylinders being closely spaced in an engine block 5 in accordance with modern automotive engineering practice. The cylinders are bored by rotary cutters 6 fixed on the ends of spindles 7 which extend through and are rotatably supported in sleeves 8 to form unitary spindle assemblies, one for each cylinder in the block 5. The individual spindle assemblies project from and are rigidly secured to but readily detachable from a common frame 9 which in turn is detachably secured to a support 10 mounted for vertical movement to feed the cutters into and out of the cylinders.

Herein the support 10 is in the form of a rectangularly shaped housing open at its upper and lower ends and having front, rear and side walls 11, 12 and 13. The wall 12 is guided by vertical ways 14 on a column along which the support may be fed by any suitable means (not shown). The frame 9 is disposed in the lower portion of the housing 10 and includes a plate 15 firmly secured to the housing as by cap screws 15ª upon removal of which the frame may be lowered and thereby detached from the housing as shown in Fig. 1.

The plate 15 is formed with a plurality of openings 16 corresponding in cross-sectional shape to the upper end portions of the sleeves 8 and having their axes spaced to correspond to the spacing of the cylinders to be bored. The surface defining each opening 16 is of substantial length and, when constructed to receive the upper end portion of the sleeve in snugly fitting relation, provides a rugged cantilever mounting which effectually holds the lower end of the sleeve against lateral flexure under the stresses to which it is subjected during boring.

Intermediate its ends, each sleeve 8 is formed with a radially disposed external shoulder in the form of an integral flange 17 of rectangular shape adapted, upon insertion of the sleeve in an endwise direction through one of the bores 16, to be brought into abutment with the flat underside of the plate 15. The sleeve may be secured rigidly to the plate by cap screws 18 extending through apertures at the corners of the flange 17 and threading into the plate. The individual spindle assemblies which are mounted on the sleeves 8 are thus adapted for ready detachment and removal from the frame 9.

In order to provide for maximum strength and lateral rigidity in the mounting of each cutter 6, the downwardly projecting and unsupported portion of each sleeve 8 below its flange 17 is of a length approximately equal to and of a uniform external diameter slightly less than the cylinder to be bored. For a similar reason, the spindle 7 is rotatably mounted within the sleeve on two spaced anti-friction bearings 19 and 20, the former of which is located closely adjacent the cutter. The other bearing 20 is located on the side of the sleeve flange 17 opposite the bearing 19 and preferably adjacent the upper end of the bore 16 in which the sleeve is mounted. Herein the bearing 20 comprises a series of anti-friction elements in the form of rollers 21 held in annularly spaced relation by suitable retaining means and inclined with respect to the spindle. The upper end of the sleeve is counterbored to receive these rollers which, in the present instance, contact a downwardly converging raceway 22 integral with the sleeve and a complemental raceway formed on a ring 23 received on a portion of the spindle having a reduced diameter.

Location of the bearing 19 closely adjacent the cutter 6 so as to center a cylinder of the size employed in modern automobile engines necessitates the construction of the bearing with a relatively small overall diameter. To accomplish this without at the same time sacrificing the strength and lateral rigidity of the cutter mounting required for the attainment of precision and high speed in boring, the bearing 19 comprises anti-friction elements 26 which run in direct contact with outer and inner complemental raceways 24 and 25 which are formed integral with the sleeve 8 and the spindle 7 respectively. In the present instance, the elements 26 are in the form of rollers with their axes inclined with respect to and converging upwardly toward the spindle axis. The rollers have end trunnions seated respectively in a retaining flange 27 integral with the spindle and in a split ring 28 secured to the spindle. The sleeve 8 is counterbored at its lower end to provide space for the rollers 26 and the outer raceway thus formed is ground exactly concentric with the sleeve axis. The inner raceway is formed in a similar way on the opposed external surface of the spindle so that when the spindle is assembled in the sleeve and clearance in the bearings taken up by properly tightening nuts 29 threading onto the spindle, a unitary assembly will be formed with the spindle mounted exactly concentric with the sleeve.

It will be apparent that by forming the raceways of the bearing 19 integral with the sleeve and spindle respectively, the available space within the limited diameter of the lower end of the sleeve 8 determined by the size of the cylinder to be bored is effectually conserved and the spindle may be made of a maximum diameter and the sleeve of maximum radial thickness and strength. With these dimensions properly coordinated and combined with the rugged cantilever sleeve mounting above described, a cutter mounting is obtained which is capable of withstanding, without objectionable lateral flexure, the severe stresses encountered in the high speed precision boring of the cylinders of automobile engine blocks and this, in spite of the substantial length of such cylinders. Accordingly, the speed at which the cutter may be fed during boring has been increased materially over prior practice and greater precision may be obtained throughout long periods of service use. In addition, all of the disadvantages above enumerated accompanying the use of so-called boring bars have been completely eliminated. Moreover, by forming the raceways of the bearing 19 with an upwardly converging taper, wear of the bearing surfaces is taken up automatically during boring and the spindle is held at all times against lateral deflection.

The cutter is securely fastened to the lower end of the spindle in centered position thereon and is at the same time adapted for quick and convenient removal under all operating conditions. For this purpose, each spindle 7, immediately beyond the lower end of the sleeve 8, is formed with an integral flange 30 of a diameter approximating that of the sleeve constituting a rigid backing for the bearing retaining flange 27 and providing a downwardly facing shoulder against which the cutter abuts when secured to the spindle. Below this flange the cutter tapers downwardly from a diameter approximating that of the spindle shank thereby forming a tapered projection adapted to be received in a correspondingly tapered bore 31 of the cutter. Inasmuch as the opposite end portions of the projection and the bore 31 provide sufficient bearing area for centering the cutter firmly on the spindle, complemental threads 32 are formed intermediate the ends of these parts to provide for ready attachment and removal of the cutter.

When the cutter is expanded by the heat developed during boring, the end thrust tends to force the cutter axially of the spindle which movement, if allowed to occur, would cause the cutter to shrink around the tapered end of the spindle upon cooling so tightly as to prevent the cutter from being screwed off from the spindle. To avoid this, the tapered surfaces on the cutter and spindle are ground with a high degree of accuracy so as to fit snugly together when the parts are cool or at normal temperature with the cutter in abutment with the flange 30. Thus, when the parts become heated in service, the flange acts to prevent the cutter from being forced more tightly onto the tapered end of the spindle enabling the cutter to be removed quickly and conveniently from the spindle.

Power for rotating the spindles is supplied by any suitable means such as an electric motor 31 mounted on the wall 12 of the housing 10 and connected to the spindles through speed reduction gearing. To provide for convenient changing of the spindle centers as will appear presently, this gearing is divided into two readily disengageable units, one mounted more or less permanently on the housing 10, the other mounted on the frame 9. Herein the first mentioned gear unit comprises a pinion 32 splined on the motor shaft 33 and meshing with a gear 34 which is rigid with a pinion 35. The latter meshes with one or two gears 36 depending on the number of spindles which are to be driven from the one motor. The pinions and the gears are rotatably supported with their axes in vertical position by three horizontal shelves 37 rigidly connected by a U-shaped plate 38 and supported within the upper end of the housing 10 by bolting the upper shelf against the upper end of the housing.

The frame 9 on which the removable gear unit is supported comprises horizontal shelves 39, 40 and 41 rigid with a forwardly opening U-shaped plate 42 upstanding from and secured as by screws 43 to the plate 15 at the lower end of the housing. Mounted on the upper shelf 39 in axial alinement with the gear 36 is a pinion 44 whose shaft 45 is splined at its upper end so as to be received in the correspondingly fluted bore of the gear 36 when the frame 9 is raised from the detached position shown in Fig. 1 to the assembled position of Fig. 2. The pinion 44 meshes with a gear 46 which is fast on a shaft 47 journaled in bearings 48 and supported by a thrust bearing 49. The shaft carries a pinion 50 meshing with drive gears 51 for one or two of the spindles.

Each gear 51 has a fluted internal bore and is mounted in anti-friction bearings 52 with its axis vertically alined with the corresponding hole 16 in the frame plate 15 so as to receive and form a splined connection with the fluted portion 53 of the spindle when the spindle assembly is inserted through the plate opening. A readily detachable splined connection is thus formed between the spindle assembly and its drive gearing. If desired, the bearings 52 are constructed to take part of the end thrust on the spindle. For this purpose, the rings forming the outer raceways are made rigid with the shelves 40 and 41 and the rings 54 forming the inner raceways are mounted on extensions 55 of the gear hub and abut against the oppositely facing shoulders thereon. To take up any looseness in the splined connection, clamping nuts 56 and 57 threading onto the spindle are tightened against the ends of the extensions 55. Access to these nuts may be had through a hand hole 58 in the front wall 11 of the housing closed by a cover 59.

From the foregoing, it will be seen that the spindle assemblies are rendered interchangeable and any one of them can be removed and replaced quickly and conveniently for purposes of adjustment or repair. This is accomplished simply by removing the nut 56 and the screws 18 after which the assembly may be lowered from its mounting in the manner illustrated in Fig. 1. Moreover, the spindle assemblies, being individually detachable from the drive gearing, are adaptable to any spacing of cylinder centers. The present boring head construction also lends itself to the changing of spindle centers quickly and with the addition of a minimum number of different parts. To make such a change, the frame 9 is first removed from the housing by removing the screws 15a which permits the frame to be lowered as shown in Fig. 1, by disconnection of the shafts 45 and gears 36. Then a new frame is inserted having different gears 51 and the sleeve holes in the plate 15 located according to the desired centering. The plate 15, the shelves 40 and 41, and the gears 50 and 51 are the only parts which must be replaced in order to make such a change, all of these being of relatively inexpensive construction. This change as well as removal and replacement of a spindle assembly may, in the present boring head, be effected quickly and with minimum labor and equipment costs. The flexibility of the boring head as a whole is thereby greatly increased.

I claim as my invention:

1. In a machine for boring cylinders of relatively small diameter and substantial length, a boring head combining a sleeve having one end of a diameter slightly less than the bore to be formed, an external flange formed integral with said sleeve and spaced from said end a distance approximating the length of said bore, a frame member having an internal surface defining an elongated recess corresponding in cross-sectional shape to and snugly receiving the opposite end portion of said sleeve, means detachably and rigidly securing said flange to said member with said flange in abutment with said member whereby said surface provides a rugged cantilever mounting for said sleeve, a spindle extending through said sleeve and having a diameter slightly less than the internal sleeve diameter, a boring cutter fixed to the spindle immediately beyond said first mentioned end of said sleeve, the inner integral surface of said sleeve closely adjacent said cutter and being shaped to provide an outer raceway and the opposed external integral surface of said spindle being shaped to provide a complemental inner raceway, a series of anti-friction elements disposed between and running in direct contact with said raceways, an additional anti-friction bearing for said spindle at the end of said sleeve opposite said cutter, and power driving means having a disengageable driving connection with said spindle permitting ready removal of the sleeve and spindle assembly upon detachment of said flange from said member.

2. In a machine for boring cylinders of relatively small diameter and substantial length, a boring head combining a support having an opening therein, a bearing sleeve having one end portion adapted to be inserted in an endwise direction into said opening and snugly received therein, the opposite end portion of said sleeve approximating the length of the cylinder to be bored and having a diameter slightly smaller than the latter, an external shoulder on said sleeve, means rigidly and detachably securing said sleeve to said support with said shoulder in abutment with the support, a spindle extending through said sleeve, a boring cutter immediately adjacent said sleeve and fixed on the end of said spindle which projects from said last mentioned end portion, complemental inner and outer raceways integral with and shaped from the opposed surfaces of said sleeve and spindle adjacent said cutter and within the sleeve, a series of anti-friction elements disposed between and running in direct contact with said raceways, and an anti-friction bearing on the side of said shoulder opposite said cutter acting to maintain said sleeve and spindle in concentric relation.

3. A head for a multiple cylinder boring machine having, in combination, a support movable in a direction longitudinally of the cylinders to be bored, a frame rigidly mounted on said support for ready detachment therefrom, a plurality of bearing sleeves spaced according to the spacing of said cylinders and each having an end portion received in said frame and detachably secured thereto, spindles extending through and rotatably supported in said sleeves, boring cutters fixed to the ends of said spindles adjacent the projecting ends of said sleeves, the opposite ends of said spindles being splined, a plurality of pinions rotatably mounted on said frame and having splined bores positioned to receive said splined ends in the positioning of the respective sleeve and spindle assemblies for attachment to said frame, speed reduction gearing on said frame for driving said pinions and including a spline shaft projecting from the frame, and a power driven pinion rotatably mounted on said support and having a splined bore positioned to receive said shaft in the positioning of said frame on the support for attachment thereto.

4. A machine for boring cylinders of small diameter in comparison with their length having, in combination, a multiple tool head, a plurality of spindle units detachably mounted in said head and each comprising a bearing sleeve having one end portion dimensioned with a diameter only slightly smaller than the boring cutter employed and projecting from said head a distance approximating the length of the cylinder to be bored, a spindle extending through said sleeve, a boring cutter fixed on the end of said spindle beyond and immediately adjacent the projecting end of the sleeve, complemental inner and outer raceways integral with the sleeve and spindle respectively and located at the extreme end of the sleeve so as to be close to the cutter, and a series of anti-friction elements disposed between and running in direct contact with said raceways, said sleeve acting independently of engagement by any part of the spindle unit, except the cutter, with the cylinder being bored to withstand the great transaxial stresses on the cutter and spindle incident to the boring operation.

5. A machine for boring cylinders of small diameter in comparison with their length, having in combination, a support, a bearing sleeve having one end portion of a diameter only slightly smaller than the cutter employed and projecting from the support a distance approximating the length of the cylinder, the radial thickness of the sleeve immediately beyond said support being dimensioned to prevent lateral flexure of the projecting end portion during a boring operation, a spindle extending through said sleeve, a boring cutter fixed on the end of said spindle beyond and immediately adjacent the projecting end of said sleeve, the extreme end of said sleeve adjacent said cutter being reduced in radial thickness to define an internal annular recess for accommodating anti-friction elements, said recess having a wall constituting an outer bearing raceway integral with the sleeve, the opposed surface of said spindle constituting an inner raceway integral with the spindle, and a series of anti-friction elements disposed between and running in direct contact with said raceways.

6. A machine for boring cylinders of small diameter in comparison with their length, having in combination, an elongated sleeve, means removably receiving one end portion of said sleeve and providing a rigid support therefor, the other end portion projecting therefrom a distance approximating the length of the cylinder and having a diameter only slightly smaller than the cutter employed, a spindle extending through said sleeve, a boring cutter fixed on the end of said spindle beyond and immediately adjacent the projecting end of the sleeve, complemental inner and outer raceways integral with and shaped from opposed surfaces of said sleeve and spindle adjacent the cutter and within the sleeve, a series of anti-friction elements disposed between and running in direct contact with said raceways, a series of anti-friction elements interposed between said spindle and said sleeve adjacent the end of the latter opposite said cutter and acting to maintain the sleeve and spindle in concentric relation, said sleeve, spindle, elements and cutter constituting a unitary assembly bodily withdrawable from said supporting means, without disturbing the bearings, and driving means disengageably coupled to said spindle to permit of such withdrawal.

7. In a machine for boring cylinders of substantial length, the combination of a tool head having an opening therein, a bearing sleeve having one end portion of a diameter slightly smaller than the cutter employed and the opposite end portion received in said opening, abutment means for axially positioning the sleeve in said opening, means rigidly securing the latter end portion in said head with said first mentioned end portion projecting from the head a distance approximating the length of the cylinder to be bored, a spindle extending through said sleeve, a boring cutter fixed on the end of said spindle immediately adjacent the projecting end of the sleeve, complemental inner and outer raceways integral with and shaped from opposed surfaces of said sleeve and spindle adjacent the cutter and within the sleeve, a series of anti-friction elements disposed between and running in direct contact with said raceways, and a bearing between said spindle and sleeve spaced from said cutter and acting to maintain the sleeve and spindle in concentric relation.

JOHN R. JOHNSON.